(12) United States Patent
Anderson

(10) Patent No.: US 12,329,125 B2
(45) Date of Patent: Jun. 17, 2025

(54) LIVESTOCK OILING APPARATUS WITH HIGHLY COMPACT CONFIGURATION

(71) Applicant: Lyle Anderson, Whitehorse, SD (US)

(72) Inventor: Lyle Anderson, Whitehorse, SD (US)

( * ) Notice: Subject to any disclaimer, the term of this patent is extended or adjusted under 35 U.S.C. 154(b) by 14 days.

(21) Appl. No.: 18/398,854

(22) Filed: Dec. 28, 2023

(65) Prior Publication Data

US 2024/0245034 A1 Jul. 25, 2024

Related U.S. Application Data

(63) Continuation-in-part of application No. 18/099,409, filed on Jan. 20, 2023, now Pat. No. 12,137,669.

(51) Int. Cl.
*A01K 13/00* (2006.01)
(52) U.S. Cl.
CPC .................................. *A01K 13/003* (2013.01)
(58) Field of Classification Search
CPC ..................................................... A01K 13/003
See application file for complete search history.

(56) References Cited

U.S. PATENT DOCUMENTS

| | | | | |
|---|---|---|---|---|
| 1,710,314 A * | 4/1929 | Kyle | ..................... | A01K 13/004 119/660 |
| 4,091,767 A * | 5/1978 | Montgomery | ....... | A01K 13/003 119/652 |
| 4,671,479 A * | 6/1987 | Johnson | ............... | F16M 11/242 248/188.7 |
| 5,255,633 A | 10/1993 | Laurenz | | |
| 6,007,032 A * | 12/1999 | Kuo | ........................ | F16M 11/16 248/188.7 |
| 6,766,623 B1 * | 7/2004 | Kalnay | ................. | E04B 1/3441 135/147 |
| D643,230 S * | 8/2011 | Hepeng | ..................... | D6/708.25 |
| D687,421 S * | 8/2013 | Slaton | .......................... | D14/229 |
| D916,173 S * | 4/2021 | Zeng | ........................... | D16/244 |
| D962,329 S * | 8/2022 | Feng | ........................... | D16/244 |

(Continued)

OTHER PUBLICATIONS

Prairie Phoenix, "Helping you do a better job for less money", 4 pages, web page www.prairie-phoenix.com/, download date Jan. 19, 2023.

(Continued)

*Primary Examiner* — Yvonne R Abbott-Lewis
(74) *Attorney, Agent, or Firm* — Jeffrey A. Proehl; Woods, Fuller, Shultz & Smith, PC

(57) ABSTRACT

A support apparatus for supporting a substance receptive element may have a central axis extending between a top and a bottom of the apparatus, and may include a central base, an upstanding stanchion mounted on the central base and extending toward the top; and a plurality of legs mounted on the base. Each leg is movable between a collapsed position and an expanded position with respect to the base. The collapsed position may correspond to a transport condition of the apparatus and the expanded position may correspond to a deployed condition of the apparatus. The base may include a plurality of mounting structures with each mounting structure being associated with a leg for mounting the leg to the base. The mounting structures may secure the legs to the base in the collapsed position of the transport condition and the expanded position of the deployed condition.

11 Claims, 17 Drawing Sheets

(56) References Cited

U.S. PATENT DOCUMENTS 11,940,717 B1 * 3/2024 Zou .................... G03B 17/56
2015/0289480 A1 10/2015 Maag

OTHER PUBLICATIONS

Prairie Phoenix, "Prairie Phoenix Cattle Care System", 12 pages, web page www.prairie-phoenix.com/shop/prairie-phoenx-cattle-care-station/, download date Jan. 19, 2023.
Prairie Phoenix, "About US", 4 pages, web page www.prairie-phoenix.com/about-us/, download date Jan. 19, 2023.

* cited by examiner

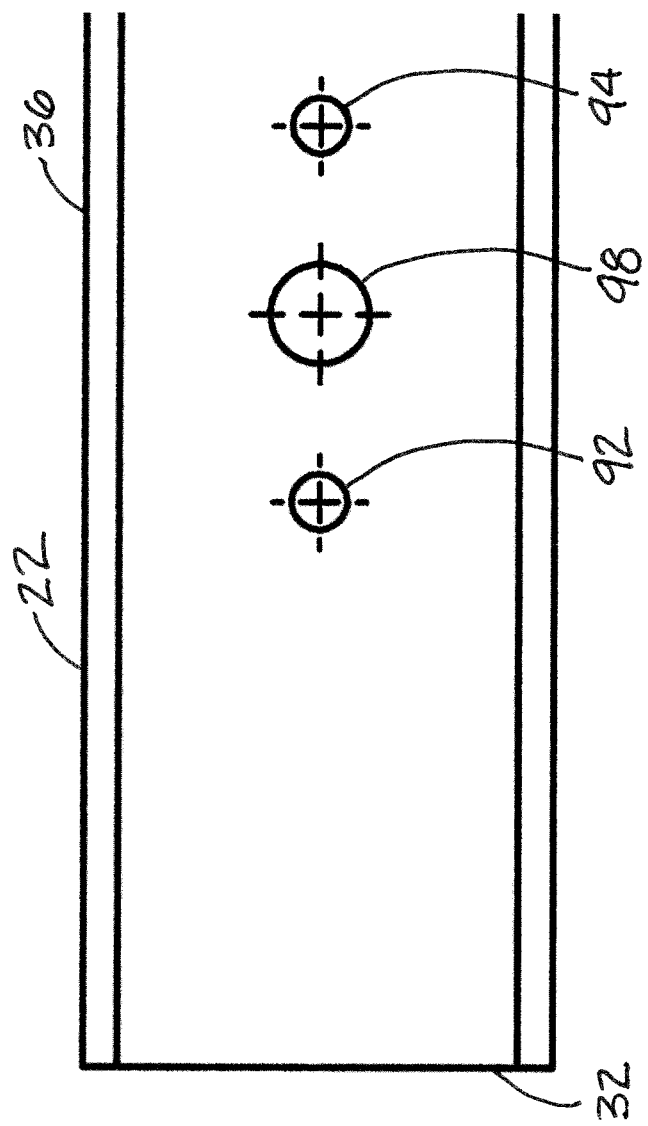

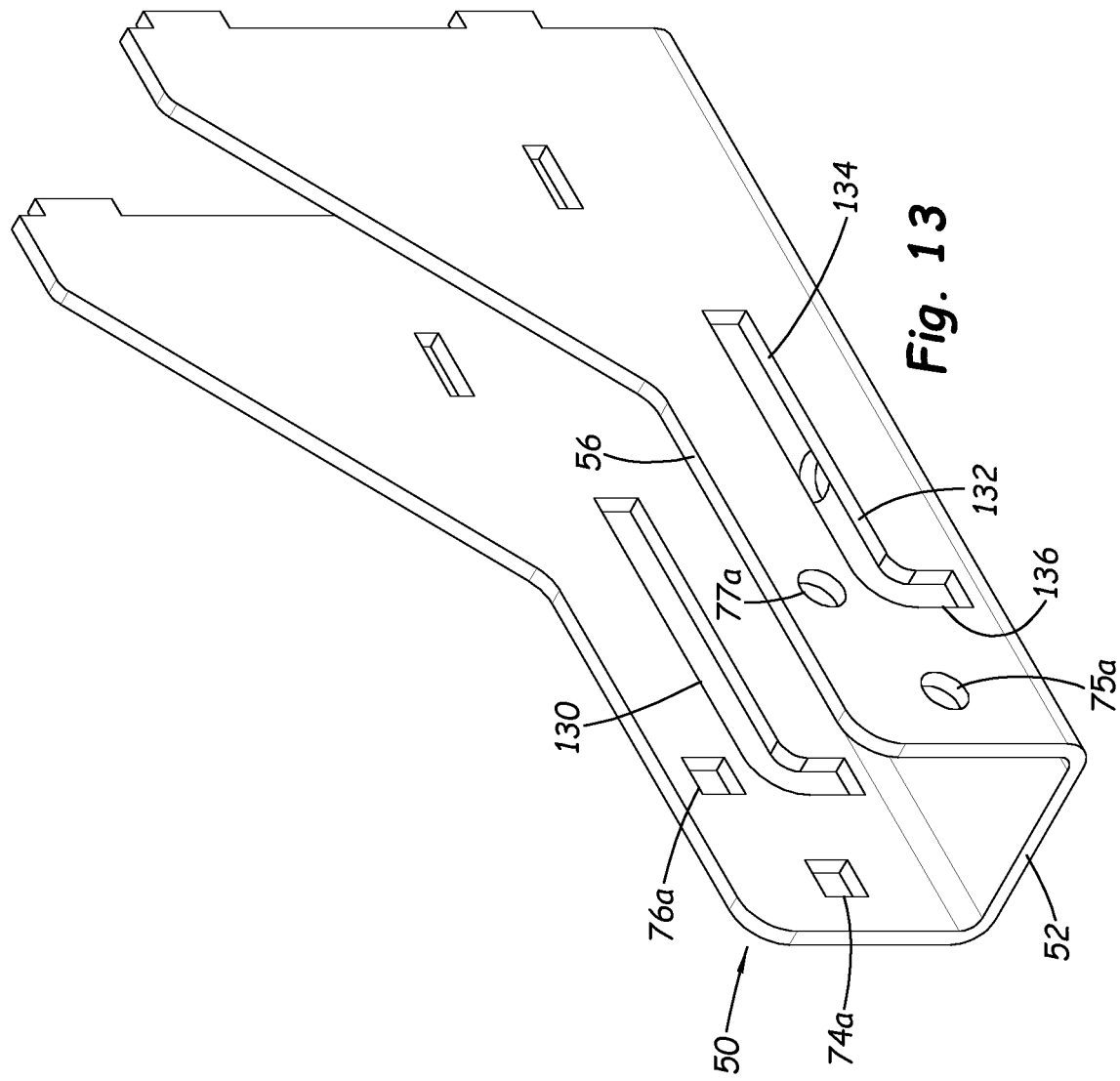

LIVESTOCK OILING APPARATUS WITH HIGHLY COMPACT CONFIGURATION

REFERENCE TO RELATED APPLICATIONS

This application is a continuation-in-part of U.S. Nonprovisional patent application Ser. No. 18/099,409, filed Jan. 20, 2023, wherein is hereby incorporated by reference herein in its entirety.

BACKGROUND

Field

The present disclosure relates to livestock oiling apparatus and more particularly pertains to a new livestock oiling system with a support apparatus with a highly compact configuration for transporting the apparatus between locations.

SUMMARY

In one aspect, the present disclosure relates to a support apparatus for supporting a substance receptive element to transfer a substance to a surface of a body of the livestock animal. The support apparatus may have a central axis extending between a top and a bottom of the apparatus. The apparatus may comprise a central base toward the bottom of the apparatus, an upstanding stanchion mounted on the central base and being elongated along the central axis to extend toward the top of the apparatus, and a plurality of legs mounted on the base with each leg being elongated with an inboard end and an outboard end. Each of the legs may be movable between a collapsed position with respect to the central base and an expanded position with respect to the central base. The collapsed position may correspond to a transport condition of the support apparatus and the expanded position may correspond to a deployed condition of the support apparatus. The central base may include a plurality of mounting structures with a said mounting structure being associated with each of the legs for mounting said leg to the base. The mounting structures may secure the legs to the central base in the collapsed position of the transport condition and the expanded position of the deployed condition.

In another aspect, the disclosure relates to a system for facilitating application of a substance to a surface of a body of a livestock animal. The system may comprise a substance receptive element configured to be moistened by the substance and configured to transfer a quantity of the substance to the surface of the body of the livestock animal when the surface comes into contact with the receptive element. The receptive element may be elongate with opposite ends. The system may further comprise a support apparatus supporting the substance receptive element, with the opposite ends of the receptive element being removably secured to the support apparatus at spaced locations on the apparatus. The support apparatus may have a central axis extending between a top and a bottom of the apparatus. The apparatus may comprise a central base toward the bottom of the apparatus, an upstanding stanchion mounted on the central base and being elongated along the central axis to extend toward the top of the apparatus, and a plurality of legs mounted on the base with each leg being elongated with an inboard end and an outboard end. Each of the legs may be movable between a collapsed position with respect to the central base and an expanded position with respect to the central base. The collapsed position may correspond to a transport condition of the support apparatus and the expanded position may correspond to a deployed condition of the support apparatus. The central base may include a plurality of mounting structures with a said mounting structure being associated with each of the legs for mounting said leg to the base. The mounting structures may secure the legs to the central base in the collapsed position of the transport condition and the expanded position of the deployed condition.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 12 is a schematic bottom view of the outboard end portion of one of the legs on which the towing component is mounted, according to an illustrative embodiment.

FIG. 13 is a schematic perspective view of a part for forming an optional configuration of the channel of a mounting structure, according to an illustrative embodiment.

DETAILED DESCRIPTION

Figure 1:
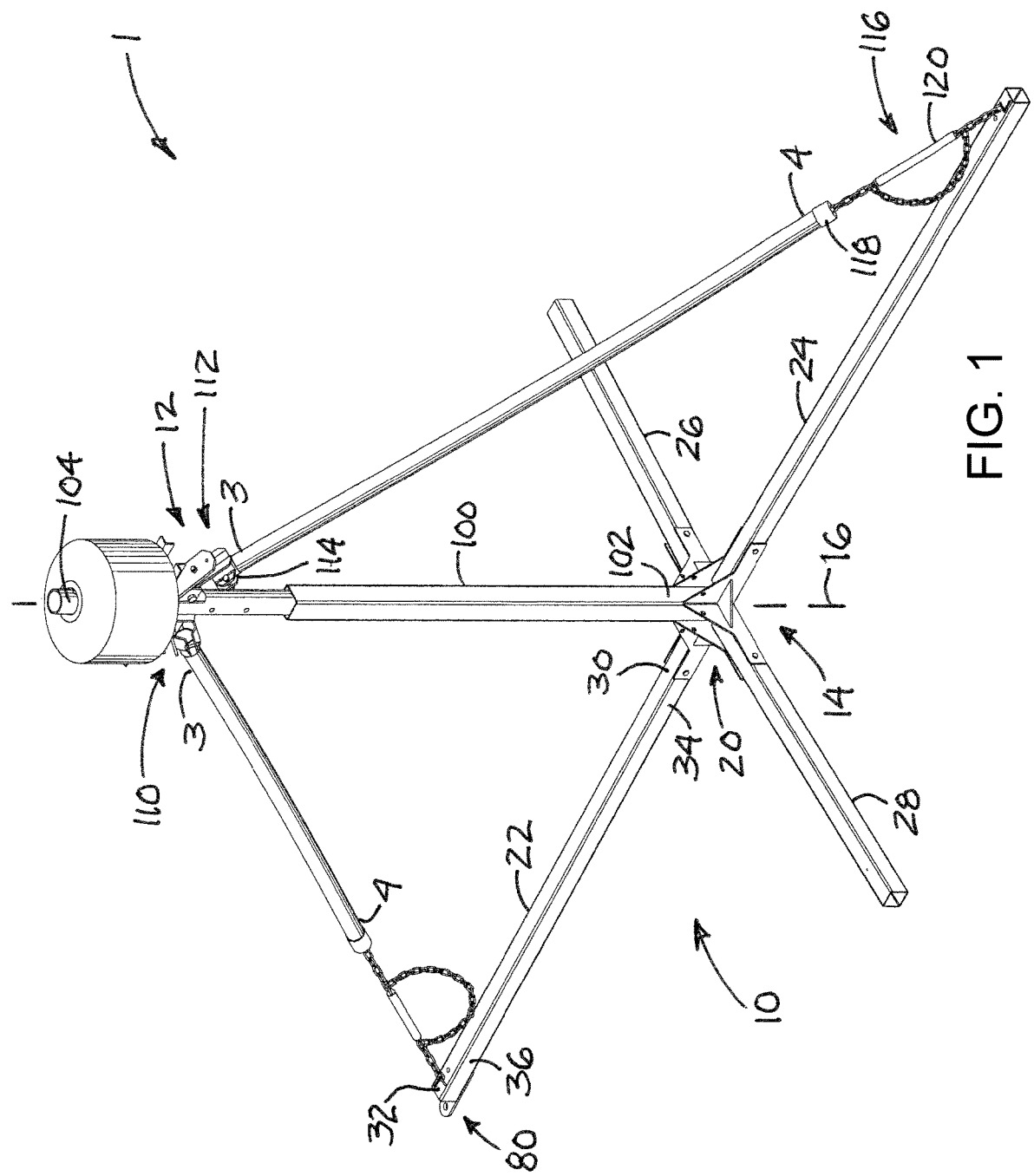
FIG. 1 is a schematic perspective view of a new livestock oiling system with a highly compact support apparatus according to the present disclosure.
Figure 2:
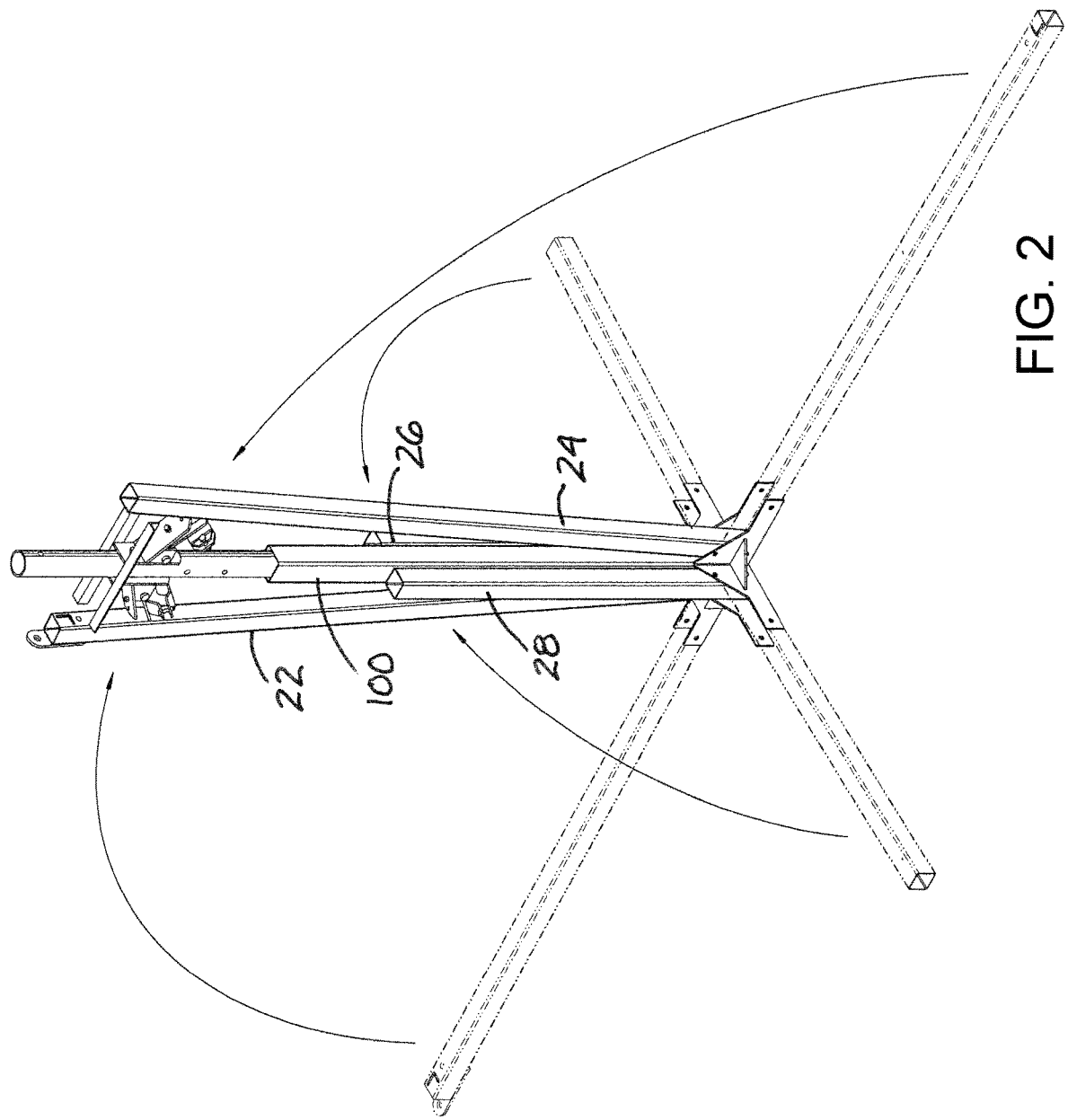
FIG. 2 is a schematic perspective view of the support apparatus with the legs shown in the collapsed positions of the transport condition of the apparatus, and the legs shown in the expanded positions of the point condition in broken lines, according to an illustrative embodiment.
Figure 3:
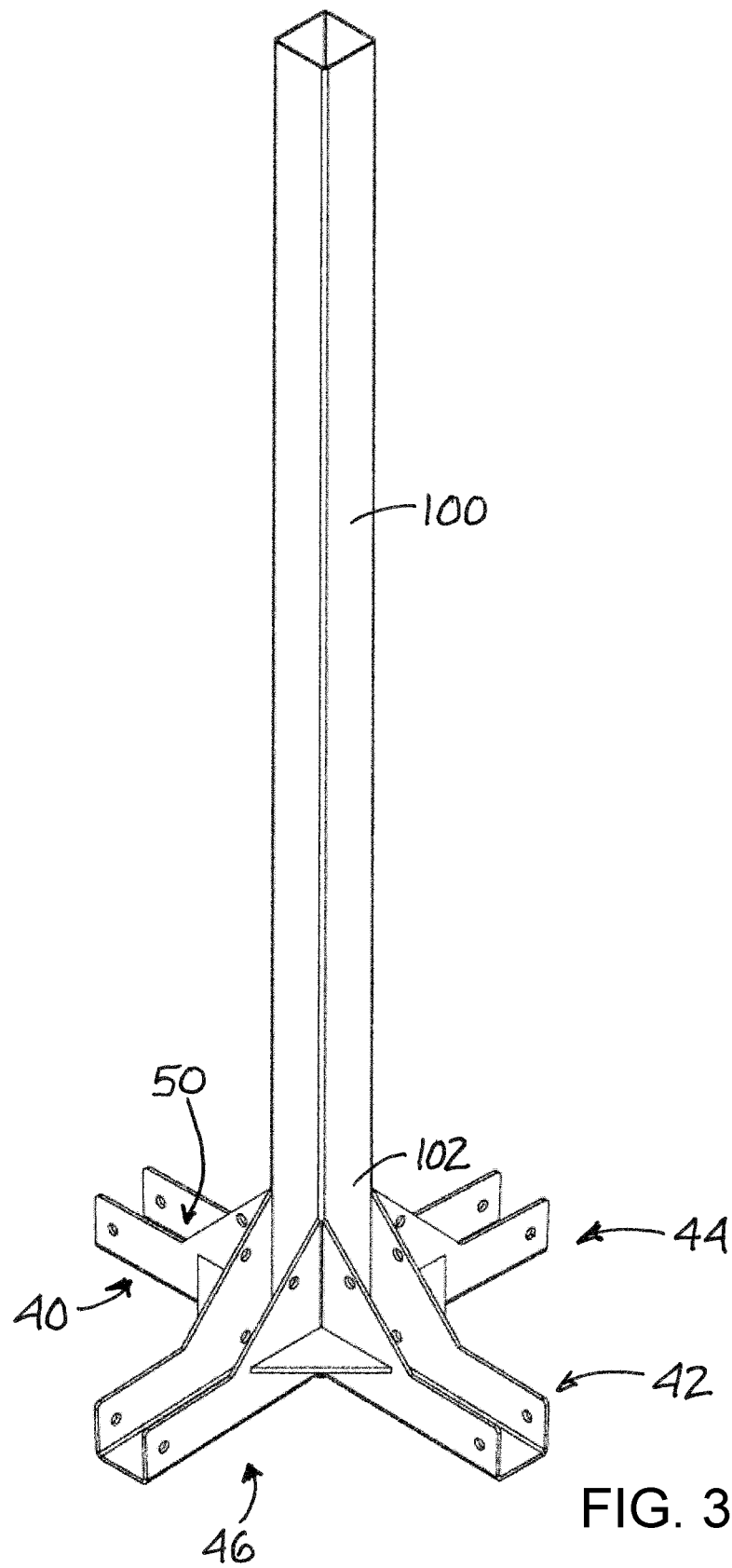
FIG. 3 is a schematic perspective view of the mounting structure and the stanchion of the support apparatus, according to an illustrative embodiment.
Figure 4:
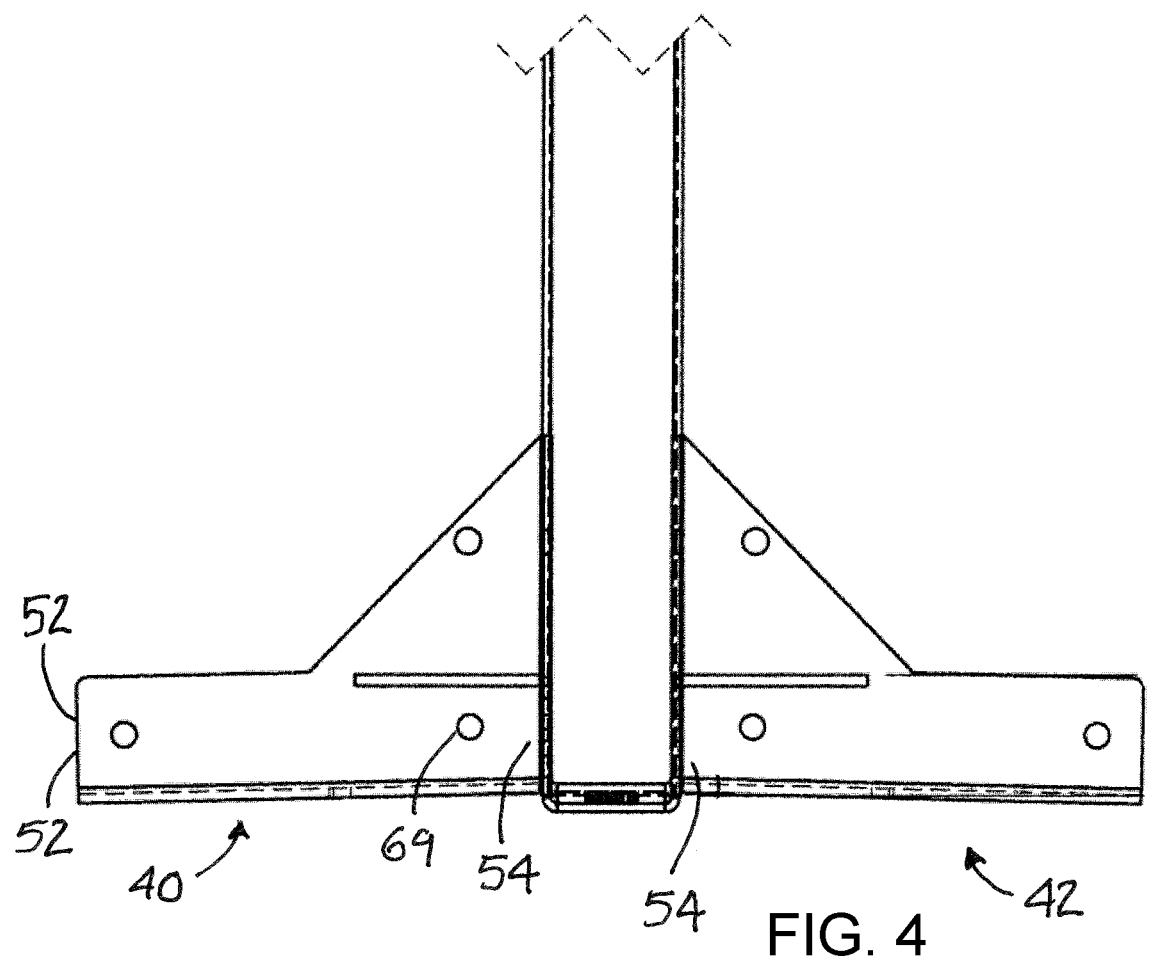
FIG. 4 is a schematic side sectional view of the mounting structure and the stanchion of the support apparatus, according to an illustrative embodiment.
Figure 5:
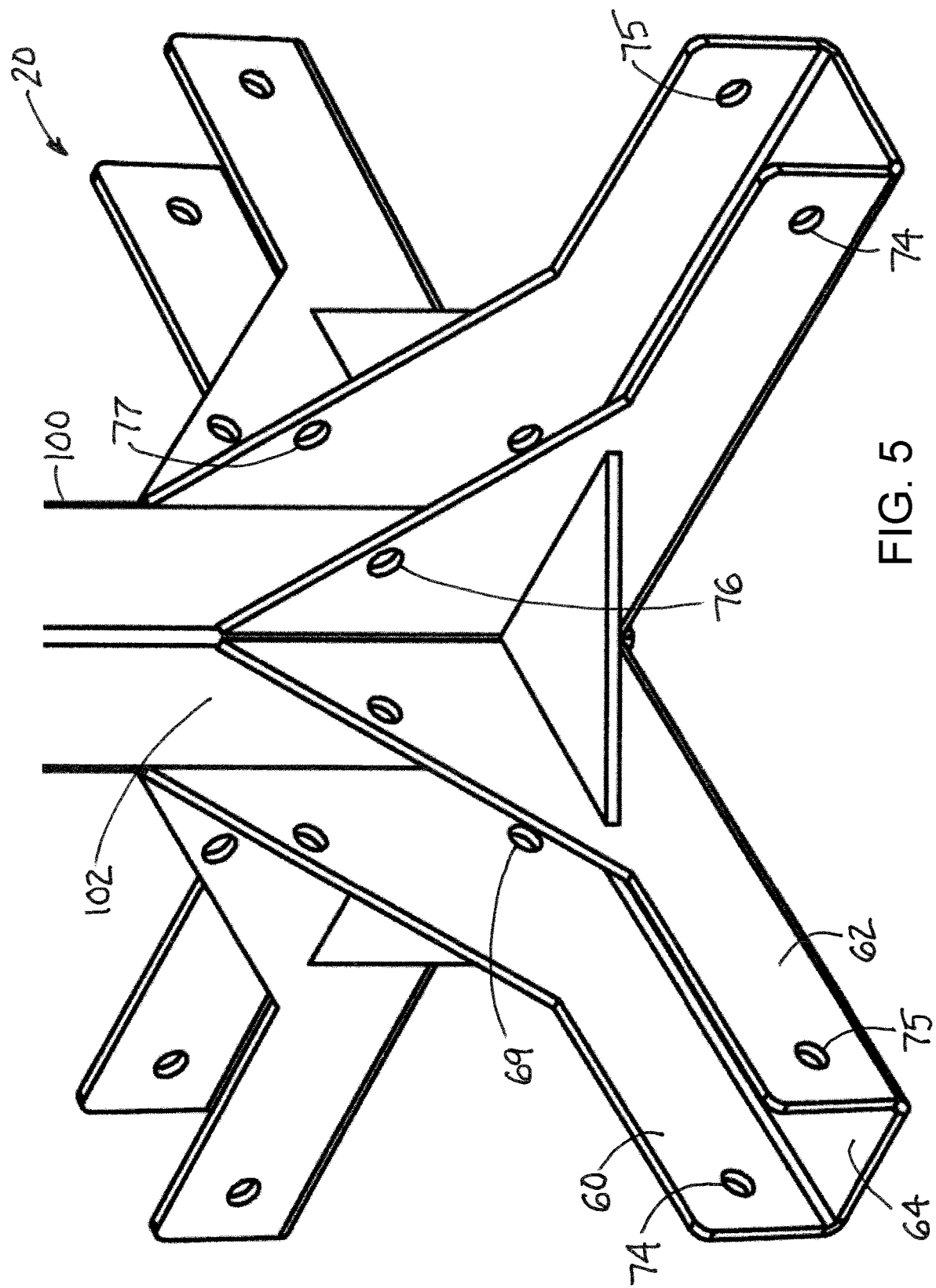
FIG. 5 is a schematic perspective view of the mounting structures of the central base, according to an illustrative embodiment.
Figure 6:
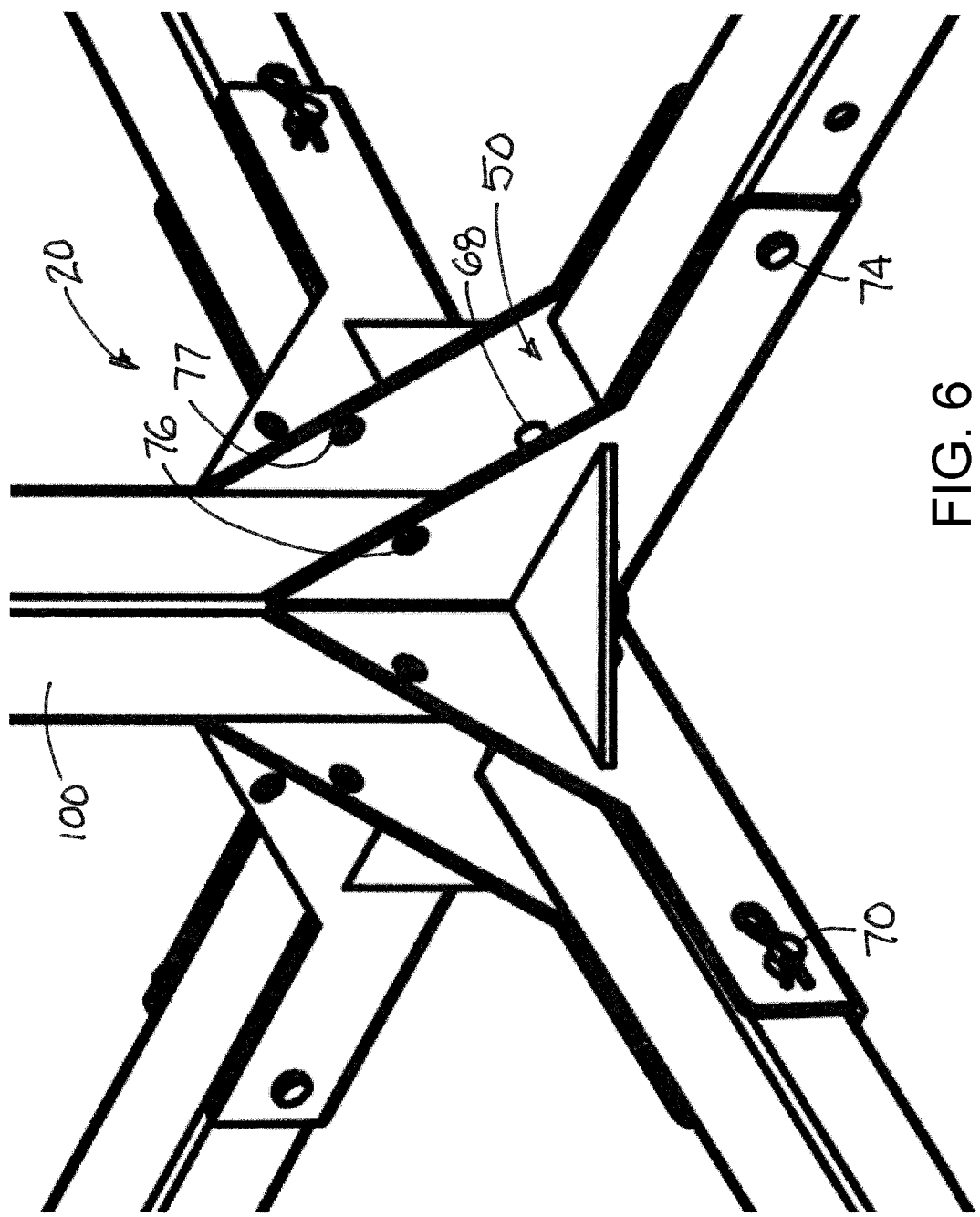
FIG. 6 is a schematic perspective view of the mounting structures of the central base and showing portions of the legs mounted thereon in the expended position, according to an illustrative embodiment.
Figure 7:
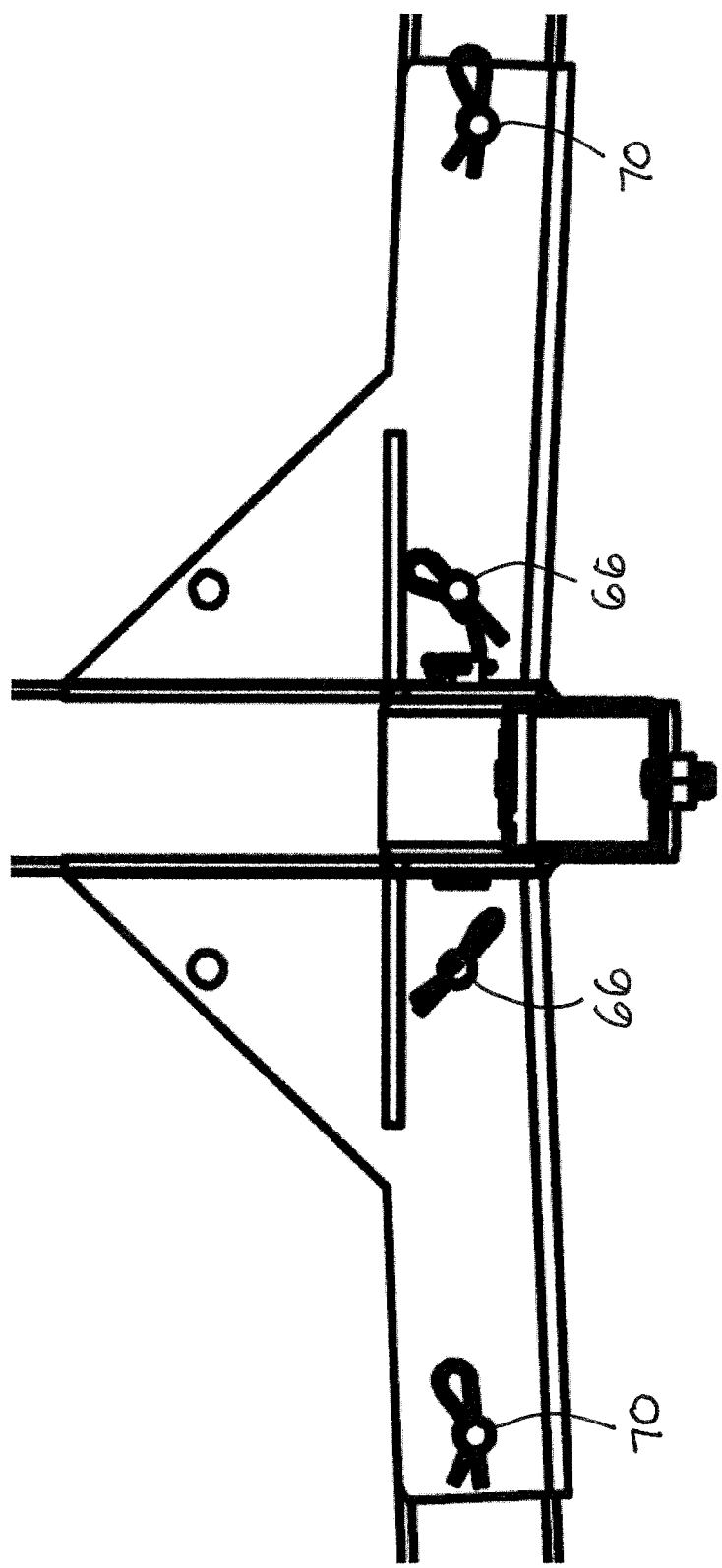
FIG. 7 is a schematic side view of the central base and portions of the legs, according to an illustrative embodiment.
Figure 8:
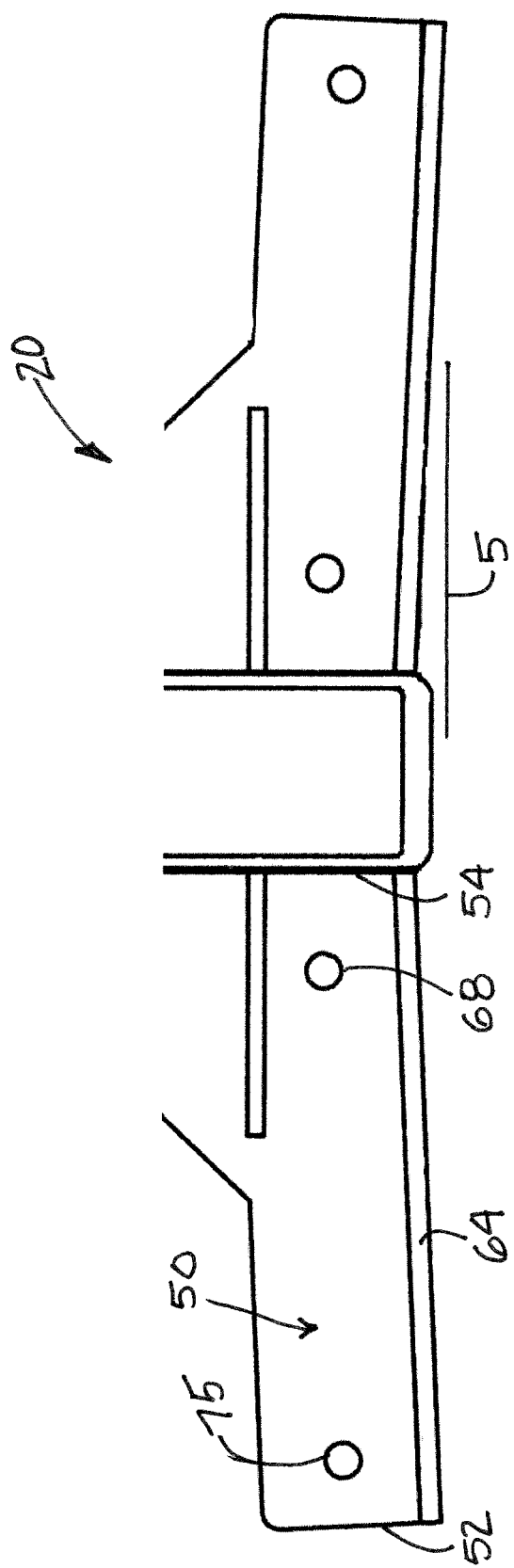
FIG. 8 is a schematic side view of the central base, according to an illustrative embodiment.
Figure 9:
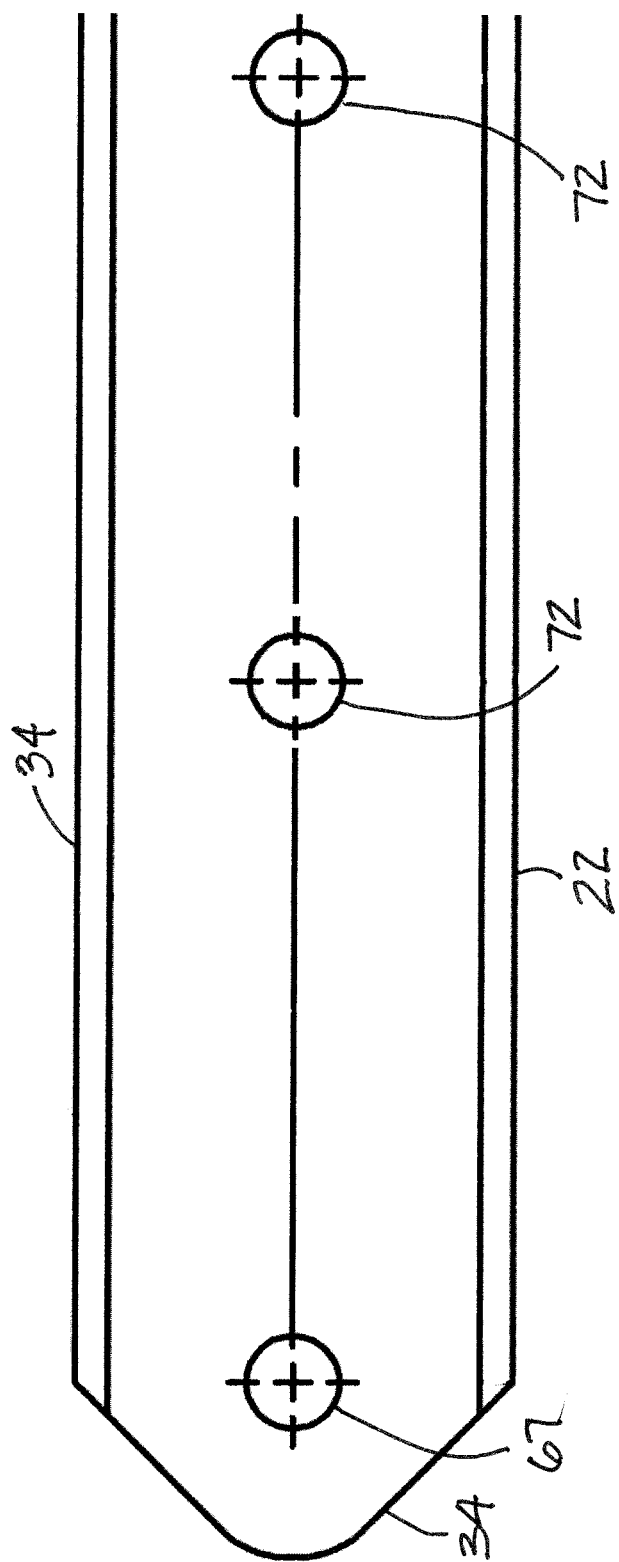
FIG. 9 is a schematic side view of the inboard end portion of one of the legs, according to an illustrative embodiment.
Figure 10:
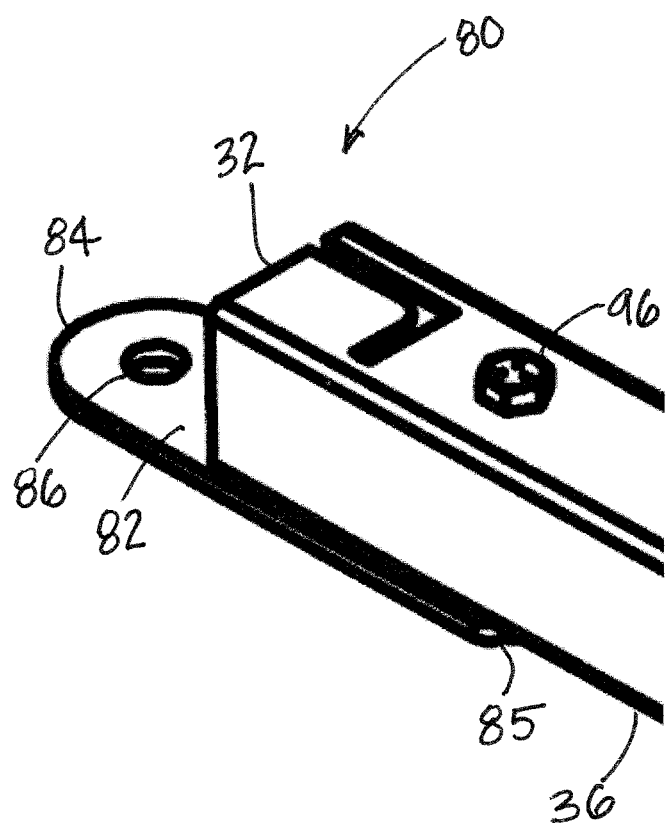
FIG. 10 is a schematic perspective view of the outboard end portion of the leg showing the towing component in the extended position, according to an illustrative embodiment.
Figure 11:
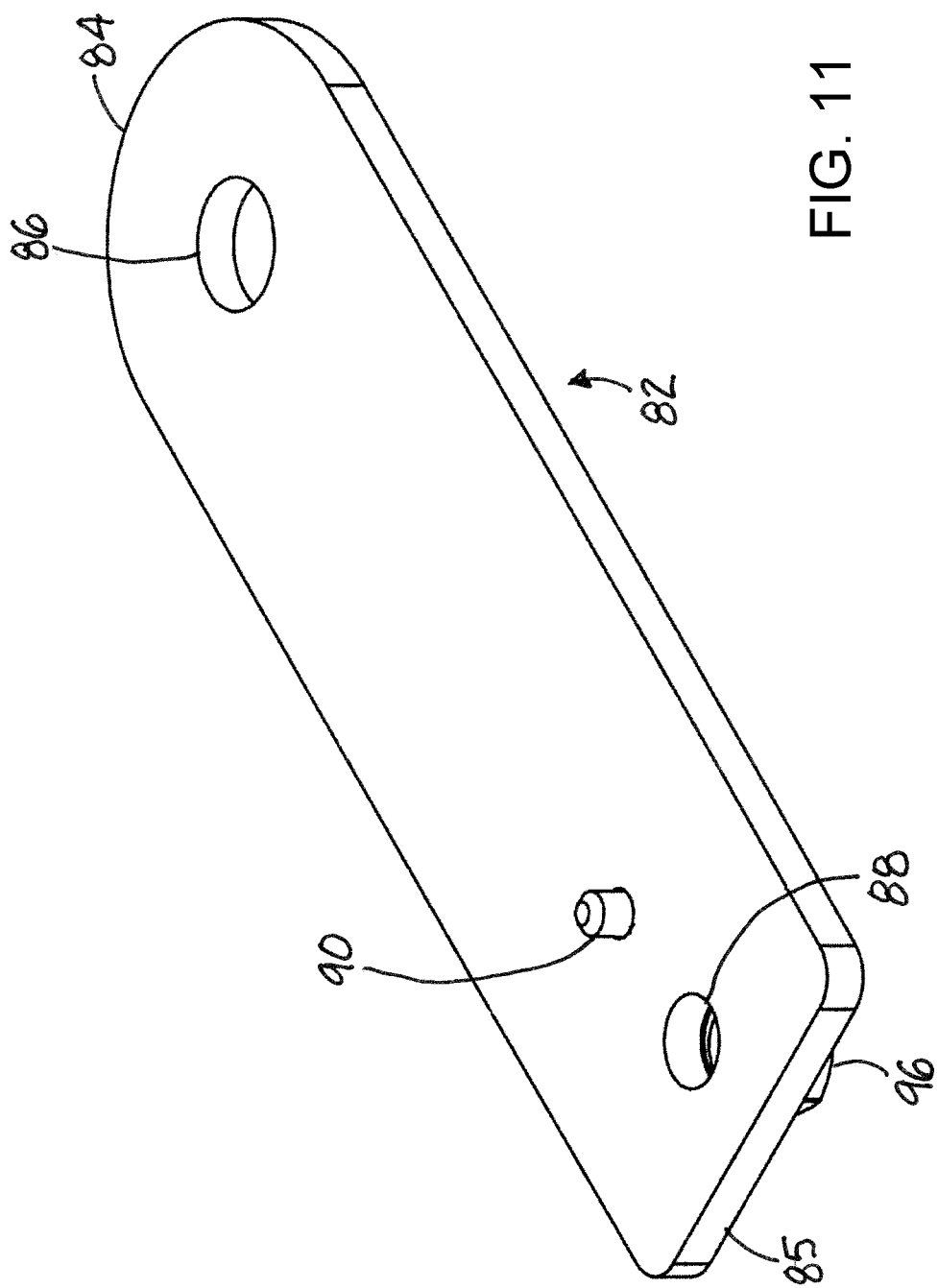
FIG. 11 is a schematic perspective view of the towing plate and detent of the towing component, according to an illustrative embodiment.

With reference now to the drawings, and in particular to FIGS. 1 through 18 thereof, a new livestock oiling system with a highly compact support apparatus which embodies the principles and concepts of the disclosed subject matter will be described.

Livestock "oiling" systems, or systems that permit a livestock animal to essentially self apply a beneficial substance (such as an insecticide) to its body, are known. U.S. Pat. No. 5,255,633 of Frank P Laurenz is one example of a highly useful oiling system, and is hereby incorporated by reference in this disclosure in its entirety.

Despite the usefulness of such systems in the agricultural field where livestock animals are grazing, the applicant has recognized drawbacks in some of the designs of the supporting apparatus utilized in such oiling systems. For example, the applicant has recognized that the rugged construction necessarily utilized for the supporting apparatus to resist the rigors of large livestock animals jostling against the elements of the system can make the apparatus unwieldy and bulky to transport, particularly in the initial shipment of the system including support apparatus from the manufacturer to the ultimate user of the system, and especially the field of the user where the livestock animals graze.

To solve this problem, the applicant has designed an oiling system, and in particular a support apparatus of the system, that has a highly compact configuration that facilitates shipping or transport of the support apparatus and as a result may greatly reduce the costs of moving the apparatus from the manufacturer to the field of the ultimate user. Aspects of the applicant's disclosure provide this benefit without compromising the strength or durability of the apparatus in the agricultural field when used by livestock animals.

In one aspect, the disclosure relates to a system 1 for facilitating application of a substance to a livestock animal, such as via self-application by the livestock through contact with an element to transfer the substance from the element to a surface of the body of the animal. The substance may have a flowable character, and may include an insecticide, and may have an oily character.

In embodiments of the disclosure, the system 1 may include a substance receptive element 2 which is configured to be moistened with the substance and is configured to transfer a quantity of the substance to the surface of the body of the livestock animal when the body surface comes into contact with the receptive element 2. The receptive element 2 may be elongate in shape with opposite ends 3, 4. Illustratively, the element 2 may comprise an elongate member suitable to conduct or transfer the substance along the length of the member, such as under the influence of gravity. illustratively, the receptive element 2 may comprise, for example, a length of a rope formed of intertwined fibers capable of conducting the substance, but other materials or constructions capable of performing this functionality may be utilized. A highly suitable assembly for providing the substance to the receptive element 2 is disclosed in the Laurenz patent (U.S. Pat. No. 5,255,633) incorporated herein, and will not be further described.

In embodiments, the system 1 may include a support apparatus 10 for supporting the substance receptive element 2. The support apparatus 10 may be configured to support the substance receptive element 2 in a manner that facilitates contact between the receptive element and the body surface of the livestock animal. The support apparatus 10 is typically employed to rest upon the ground surface 5 and support the substance receptive element 2 in a suspended manner between two spaced points or locations on the support apparatus above the surface 5. In general, the support apparatus 10 has a top 12 and a bottom 14, and a central axis 16 which extends between the top and bottom and which is substantially vertically oriented when the apparatus is situated for use. A width measurement or dimension of the support apparatus 10 may be measured in a direction perpendicular to the central axis 16.

The support apparatus 10 may be characterized by having a transport condition which may be a configuration of the apparatus 10 that is relatively more suitable for shipping the apparatus 10 over long distances, such as when the apparatus is being transported from the manufacturer or seller to the ultimate customer. The support apparatus 10 may also be characterized by a deployed condition which may be a configuration of the apparatus that is the configuration most suitable for the apparatus to have for supporting the substance receptive element 2. The transport condition may be characterized by the width measurement of the apparatus 10 being smaller than the width measurement of the apparatus in the deployed condition.

In greater detail, the illustrative embodiments of the support apparatus 10 may comprise a central base 20 and a plurality of legs 22 mounted on the base. Illustratively, the plurality of legs 22, 24, 26, and 28 may include four legs, although more or fewer legs may be utilized. For the purposes of this description, the leg 22 will be described with the understanding that the legs 24, 26, and 28 may have the same configuration unless specifically noted.

The leg 22 may be characterized by being elongated in shape and having an inboard end 30 and an outboard end 32 relative to the central axis 16. Each leg 22 may have an inboard end portion 34 toward the inboard end 30 and an outboard end portion 36 toward the outboard end 32. Each leg 22 has a length between the inboard 30 and outboard 32 ends. In some embodiments, a first pair 22, 24 of the legs may have a first length and a second pair 26, 28 of the legs may have a second length, and the first length is longer than the second length. As an illustrative example, the length of the legs are such that the distance between the outboard ends of the first pair of legs is approximately 170 inches, and the distance between the outboard ends of the second pair of legs is approximately 100 inches.

Each leg 22 is movably mounted on the central base 20, and may be movable between a collapsed position with respect to the base and an expanded position with respect to the base. In embodiments, the collapsed position of the leg may correspond to the transport condition of the support apparatus, and the expanded position of the leg may correspond to the deployed condition of the apparatus 10. The collapsed position of the leg may be further characterized by the leg extending substantially parallel to the central axis 16 of the apparatus 10, and the expanded position may further be characterized by the leg extending substantially perpendicular to the central axis. The plurality of legs 22, 24, 26, and 28 may radiate outwardly with respect to the central axis 16 in the expanded position, and the expanded position may also be characterized by each of the legs extending substantially perpendicular to a pair of the legs and parallel to another one of the legs.

In the illustrative embodiments, the central base 20 has a mounting structure 40 associated with each of the legs for mounting the corresponding or respective leg to the base 20. The mounting structures 40 may secure the legs 22 to the base 20 in the expanded position of the deployed condition and also in the collapsed position of the transport condition. The central base 20 may thus have a plurality of the mounting structures 40, 42, 44, and 46 which are configured to support the legs 22 in substantially perpendicular orientations when the legs are each in the expanded positions. For the purposes of this description, the mounting structure 40 will be described with the understanding that structures 42, 44, and 46 may have the same configuration unless specifically noted.

In some embodiments, the mounting structures 40 may be configured to support the legs 22 along individual axes that deviate from a perpendicular orientation to the central axis in the expanded position to effectively raise the base 20 above a ground surface when the legs 22 are in the expanded position, such that the support apparatus 10 tends to rest upon the ground surface at the outboard end portions of the legs rather than the base 20.

For example, the orientations of the mounting structures 40 may be configured such that the axes of the legs deviate approximately 1.5 degrees from the perpendicular to the central axis, such that the axis of a leg is oriented approximately 91.5 degrees from the section of the central axis above the leg (e.g., toward the top 12) and approximately 88.5 degrees from the section of the central axis below the leg (e.g., toward the bottom 14. As another example, the orientations of the mounting structures 40 may be configured such that the axes of the legs deviate approximately 5 degrees from the perpendicular to the central axis, such that the axis of a leg is oriented approximately 92.5 degrees from the section of the central axis above the leg (e.g., toward the top 12) and approximately 87.5 degrees from the section of the central axis below the leg (e.g., toward the bottom 14. It will be recognized that variations in the length of the respective legs may necessitate different angular deviations depending upon, for example, the relationship between the lengths.

In illustrative embodiments, the mounting structure 40 may define a channel 50 for receiving a portion of the respective leg 20, such as the inboard end portion 34. The extent of the inboard end portion 34 that is received by the channel 50 may be greater in the expanded position of the leg than the extent that is received in the channel in the collapsed position. In greater detail, the channel 50 may have an outer end 52 away from the central axis 16, and the outer end may be open to permit the leg 22 to extend through the open outer end of the channel when the leg is in the expanded position. The channel 50 may also have an inner end 54 located closer to the central axis 16, and the inner end may be closed. The channel 50 may also have an open upper slot 56 opening upwardly toward the top 12 of the support apparatus, and the slot 56 may extend from the outer end 52 to the inner end 54 of the channel. The leg 22 may extend through the open upper slot 56 when the leg 22 is in the collapsed position. The channel 50 may be formed by a pair of opposed side walls 60, 62 and a bottom wall 64 extending between the pair of side walls.

The inboard end 30 of the leg 22 may be movably mounted on the mounting structure 50 of the base, and in embodiments, the end 30 is pivotally mounted on the structure 50. Illustratively, a pivot pin 66 may pivotally mount the inboard end portion 34 of the leg 22 to the side walls 60, 62 of the mounting structure. The pivot pin 66 may extend through a pivot aperture 67 in the leg 22 and through pivot holes 68, 69 formed in the side walls of the channel.

The mounting structure 50 may be configured to releasably secure the leg 22 in the expanded position, and may also releasably secure the leg in the collapsed position. Illustratively, the structure 50 may include a securing pin 70 for removably securing the leg in the expanded position, and the pin 70 may also removably secure the leg in the collapsed position. The securing pin 70 may be removably insertable through a securing aperture 72 in the leg and through securing holes in the side walls of the channel of the mounting structure. A first set 74, 75 of the securing holes may be alignable with the securing aperture 72 in the leg when the leg is in the expanded position, and a second set 76, 77 of the securing holes may be alignable with the securing aperture in the leg when the leg is in the collapsed position.

The support apparatus 10 may also include a towing component 80 mounted on one of the legs 22, and may be located on the outboard end portion 36 of the leg. The towing component 80 may be movably mounted on the leg such that the component is movable between an extended position and a retracted position. Illustratively, the towing component 80 may be rotatably mounted on the leg so that the towing component rotates between the extended and retracted positions.

In an illustrative embodiment, the towing component 80 includes a towing plate 82 which may be elongated in shape with a first end 84 and a second end 85. The towing plate 82 may have a towing aperture 86 that is located toward the first end 84 and may have a mounting hole 88 that is located toward the second end 85. The towing component 80 may further comprise a detent 90 on the towing plate 82 that is alignable with a first indentation 92 in the leg 22 when the leg is in the extended position, and is alignable with a second indentation 94 in the leg when the leg is in the retracted position. Each of the indentations 92, 94 may comprise a hole formed in the leg. The towing component 80 may further include a fastener 96 that extends through a mounting aperture 98 in the leg 22 and the mounting hole 88 of the towing plate to rotatably secure the towing plate to the leg.

The support apparatus 10 may further include an upstanding stanchion 100 mounted on the central base 20. The stanchion 100 is elongated along the central axis 16 of the apparatus 10, and extends upwardly toward the top 12 from the base. The stanchion 100 has a lower end 102 mounted on the base 20 and an upper end 104 opposite of the lower end 102. Optionally, the stanchion 100 may be selectively extendable and retractable to adjust the distance between the mower 102 and upper 104 ends.

The support apparatus 10 also includes a receptive element securing structure 110 for securing the receptive element 2 to the support apparatus 10, such as to the stanchion 100 and one of the legs 22. In some of the most preferred embodiments, a securing structure 110 is provided on opposite sides of the stanchion 100, such as at locations generally corresponding to the first pair 22, 24 of the legs. An upper portion 112 of the securing structure 110 may secure the uppermost end 3 to the stanchion 100 for securing the receptive element 2 to the stanchion. The upper portion 112 may be located toward the upper end 104 of the stanchion such that the receptive element 2 may be suspended by the upper portion 112 over the respective leg. Illustratively, the upper portion 112 of the structure may include an upper clamping member 114 which is configured to clamp onto the uppermost end 3 of the receptive element, and the upper clamping member may be movable or pivotable with respect to the stanchion 100 to facilitate a degree of movement of the element 2 with respect to the stanchion. A lower portion 116 of the securing structure 110 may secure the lowermost end 4 of the suspended receptive element to one of the legs 22 and may be secured to the respective leg at a location toward the outboard end 32 of the leg such that the suspended element 2 extends downwardly and outwardly with respect to the stanchion 100. Illustratively, the lower portion 116 may include a lower clamping member 118 which is configured to clamp onto the lowermost end of the element 2. Optionally, the lower portion 116 may include a tension element, such as a spring member 120, which permits a degree of movement of the receptive element under tension when the body of the livestock animal comes into contact with the element 2. Additional members, such as linking chains, may be utilized in combination with, or in place of, the spring member 120.

In embodiments of the disclosure, the upper 114 and/or lower 118 clamping member may include at least one clamp portion 122 for positioning about at least a section of the receptive element 2. Typically, one or both of the clamping members may include a pair of the clamp portions 122, 123 which are releasably fastened together by fasteners, such as bolts. Tightening of the fasteners to move the clamp portions 122, 123 closer together tends to pinch the receptive element 2 between the clamp portions and retain the element on the clamping member. At least one, and typically both, clamp portions 122, 123 have an arcuate inner surface 124 configured to generally correspond to an outer surface of the receptive element when the pair of clamp portions are positioned with the inner surfaces in opposition to each other.

Advantageously, the clamping member, particularly the upper clamping member 114, may include a gripping part 126 positioned on the at least one clamp portion to facilitate gripping of the receptive element 2 by the clamping member. The gripping part 126 may be positioned adjacent to the inner surface 124 of the clamp portion. The gripping part 126 may be directly attached to the clamp portion, or may be held in position by the clamping force applied to the part 126 and the receptive element by the clamp portions. Optionally, a gripping part 126 may be positioned adjacent to each of the clamp portions 122, 123, although a gripping part may be positioned adjacent to only one of the clamp portions.

The gripping part 126 has at least one projecting spike 128, and typically may have a plurality of projecting spikes 128, 129, that extend inwardly away from the clamp portion and into the receptive element 2. Illustratively, the plurality of projecting spikes 120, 129 may extend radially inwardly from the gripping part 126 positioned on the inner surface of the clamp portion. The projecting spikes 128, 129 may extend from a base plate having an arcuate configuration that generally corresponds to the arcuate inner surface 124 of the clamp portion.

Figure 14A:
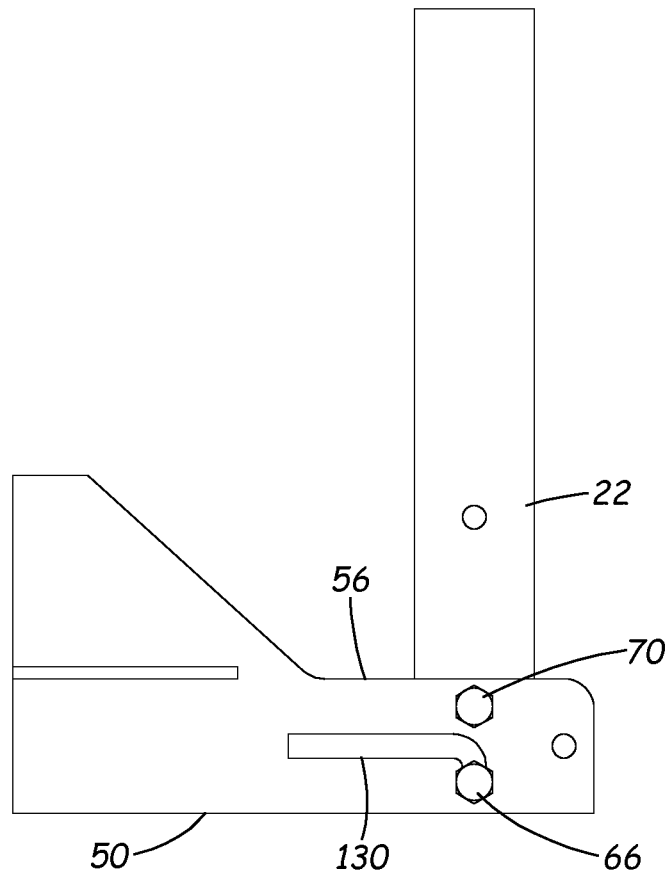
FIG. 14A is a schematic side view of a broken away portion of an embodiment of the mounting structure utilizing the optional channel configuration of FIG. 13 of the mounting structure, with the leg mounted on the channel shown in a collapsed position, according to an illustrative embodiment.
Figure 14B:
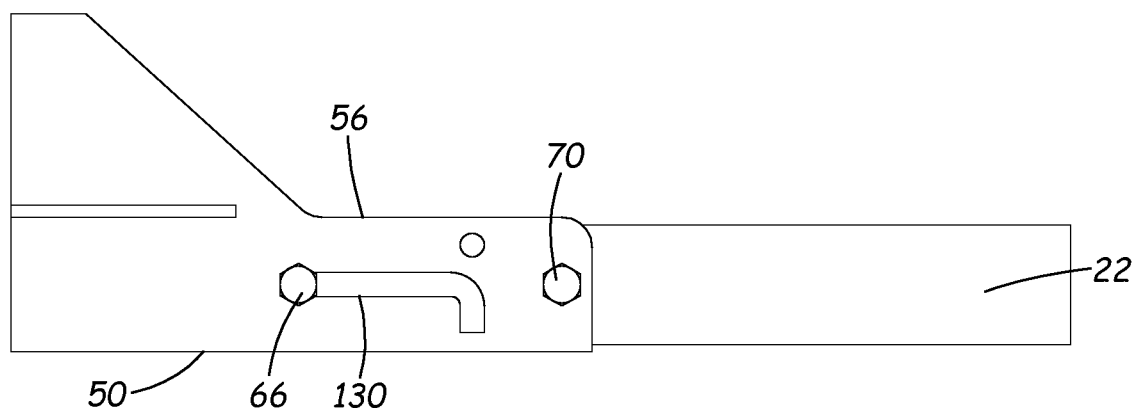
FIG. 14B is a schematic side view of a broken away portion of an embodiment of the mounting structure utilizing the optional channel configuration of FIG. 13 of the mounting structure, with the leg mounted on the channel shown in an expanded position, according to an illustrative embodiment.
Figure 15:
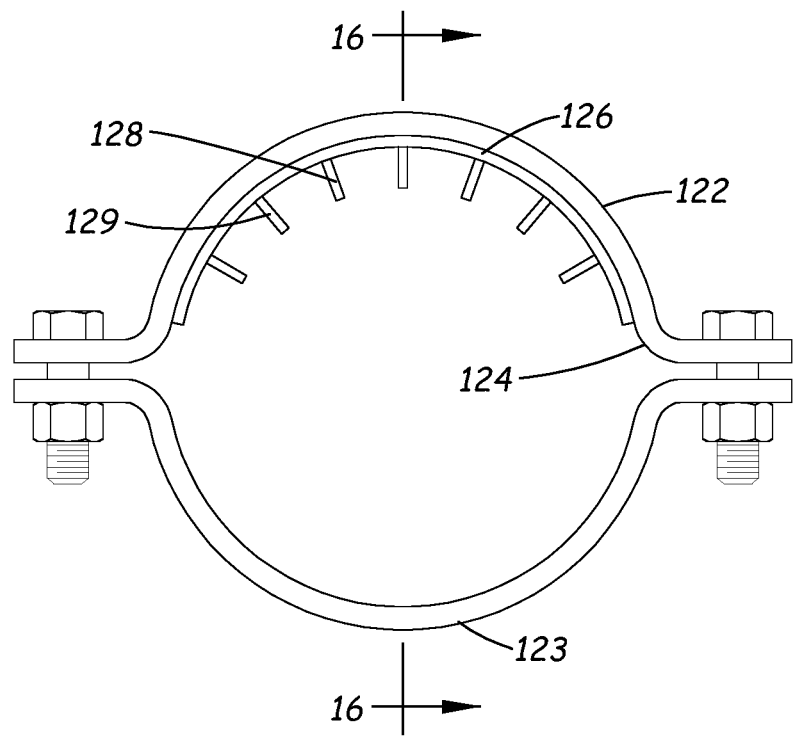
FIG. 15 is a schematic side view of an upper clamping member of the securing structure with an optional gripping part, according to an illustrative embodiment.
Figure 16:
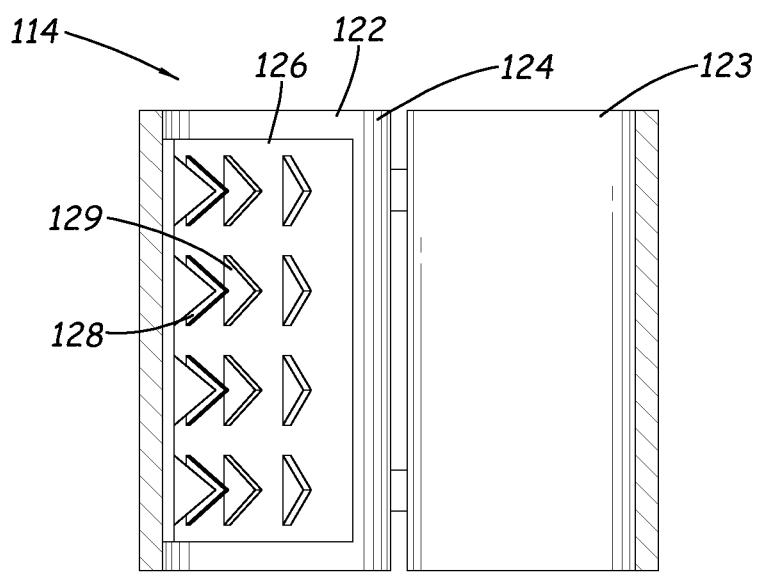
FIG. 16 is a schematic sectional view of the upper clamping member taken along line 16-16 of FIG. 15, according to an illustrative embodiment.
Figure 17:
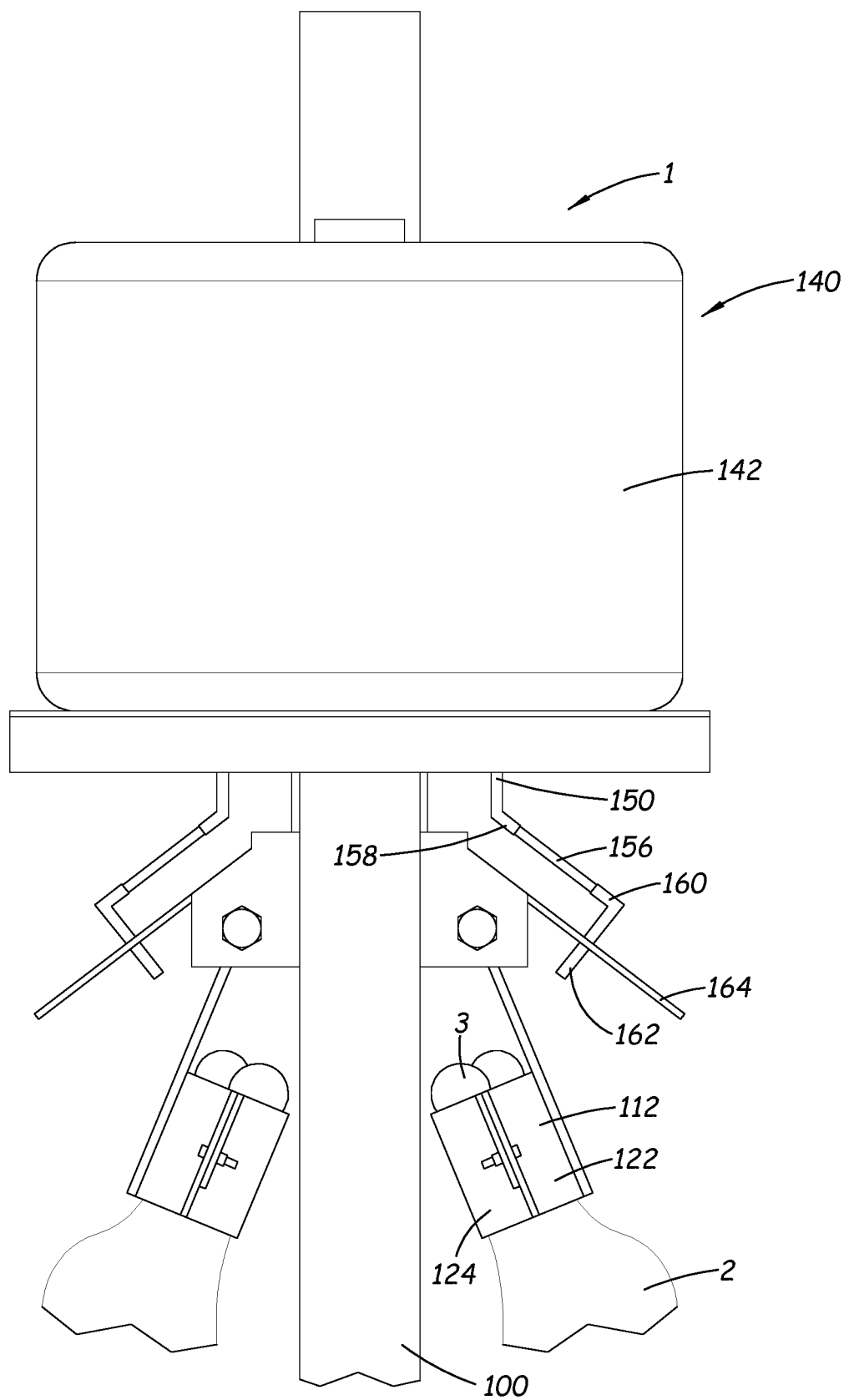
FIG. 17 is a schematic front view of a substance supply assembly of the system isolated from other elements of the system, according to an illustrative embodiment.
Figure 18:
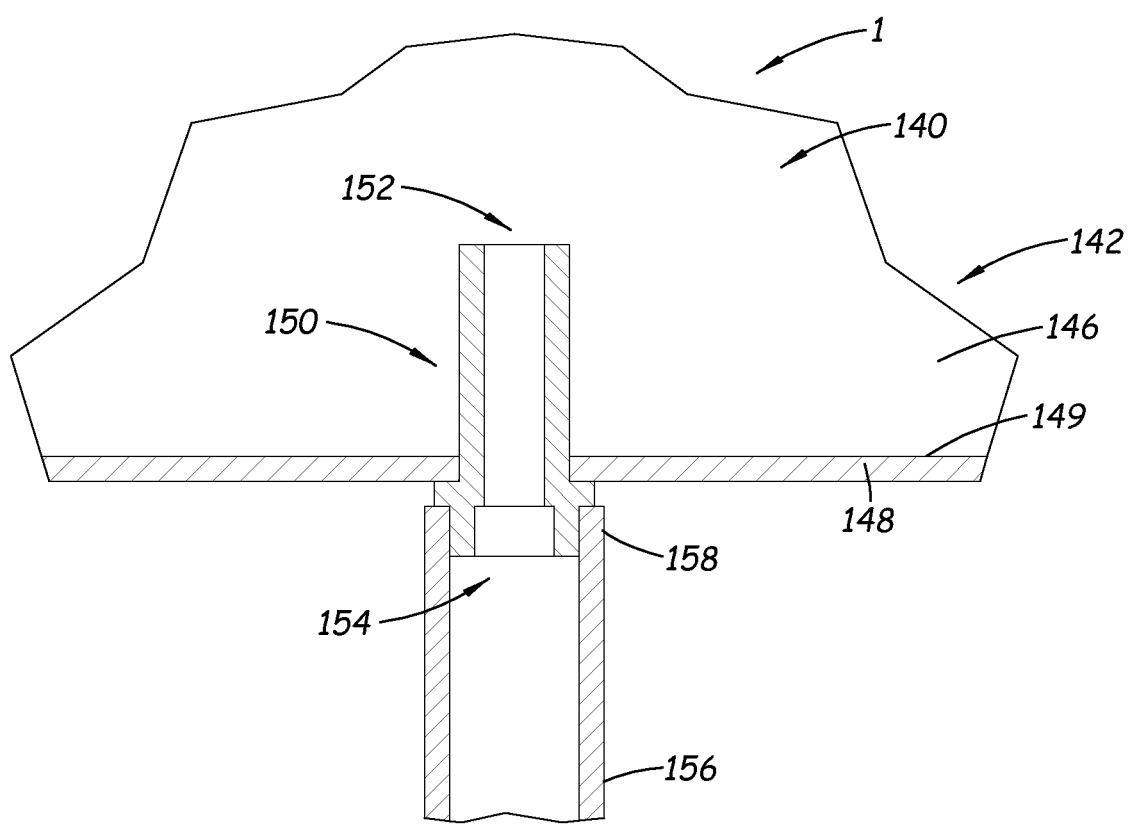
FIG. 18 is a schematic sectional view of a broken away portion of the substance supply assembly of the system, including portions of the supply tank with the supply fitting and supply conduit, according to an illustrative embodiment.

In some embodiments, such as is shown in FIGS. 13, 14A and 14B, the mounting structure employed to mount a respective leg on the base 20 may have another configuration that varies to a degree from other configurations. In such configuration, the mounting structure may include a positioning slot 130 for guiding movement of the respective leg as the leg moves between the collapsed position (see, e.g., FIG. 14B) and the expanded position (see, e.g., FIG. 14A). The positioning slot 130 may be configured to receive the pivot pin 66 of the mounting structure such that the pivot pin is able to move along the slot 130 as the leg moves between the collapsed and expanded positions. In the illustrative embodiments, the mounting structure includes a pair of the positioning slots 130, 132 with each of the slots being located in one of the side walls 60, 62 of the channel 50.

Each of the positioning slots 130, 132 may have a primary portion 134 and a secondary portion 136. The primary 134 and secondary 136 portions may extend in different directions with respect to the channel 50, and illustratively the primary portion 134 may extend substantially parallel to the open upper slot 56 and may define the position of the pivot pin 66 in the expanded position of the leg. The secondary portion 136 may extend substantially perpendicular to the primary portion and may define the position of the pivot pin in the collapsed position of the leg. A first set 74a, 75a of securing holes in the side walls 60, 62 may be alignable with the securing aperture in the leg when the leg is in the expanded position. Illustratively, the first set of securing holes may be positioned on the respective side walls between the respective positioning slots 130, 132, and the open outer end 52 of the channel. A second set 76a, 77a of securing holes in the side walls 60, 62 may be alignable with the securing aperture in the leg when the leg is in the collapsed position. Illustratively, the second set of securing holes may be positioned on the respective side walls between the positioning slot and the open upper slot of the channel. In use, movement of the leg from the collapsed position to the expanded position may include removal of the securing pin from the securing aperture in the leg and from the second set of securing holes, sliding of the pivot pin from the secondary portion of the positioning slot to the primary portion of the securing slot, and insertion of the securing pin through the securing aperture and the first set of securing holes and the leg.

The system 1 may also include a substance supply assembly 140 for supplying the substance to the receptive element 2, preferably in a controlled manner. The supply assembly 140 may be supported on the support apparatus 10, such as on the upstanding stanchion 100, and may be located toward the top 12 of the support apparatus to facilitate flow of the substance by the influence of gravity. The supply assembly 140 may include a supply tank 142 configured to hold a quantity of the substance, and the tank has an interior 144 for receiving the quantity of the substance. The supply tank may have a tank wall 146 with a lower portion 148 of the wall being positioned toward a bottom of the tank. The lower portion 148 has an upper surface 149 which is contacted by the substance in the interior of the tank.

The substance supply assembly 140 may also include a supply fitting 150 mounted on the supply tank for dispensing the substance from the supply tank. The supply fitting 150 may be mounted on the tank wall 146 to protrude upwardly from the upper surface 149 of the lower portion of the tank wall into the interior of the tank. The supply fitting 150 may have an upper end 152 positioned in the interior of the supply tank and a lower end 154 positioned outside the interior of the tank. The supply fitting 150 may protrude upwardly from the lower portion 148 of the tank wall, and thus may be positioned above the upper surface of the lower portion of the tank wall at least about ¼ inch. Illustratively, the supply fitting 150 may be threadedly mounted on the lower portion of the tank wall, or in any suitable manner.

The supply assembly 140 may further include a supply conduit 156 in fluid communication with the supply fitting 150 to receive the substance from the supply tank. The supply conduit 156 has a first end 158 connected to the supply fitting 150 to intake the substance from the interior of the tank, and a second end 160 to output the substance.

A drip fitting 162 of the substance supply assembly 140 may be configured to drip the substance onto the receptive element 2 to wet the element with the substance. The drip fitting 162 may be in fluid communication with the second end 160 of the supply conduit. The drip fitting 162 may be supported on the stanchion above the receptive element in order to permit dripping of the substance onto the receptive element. A drip fitting support 164 may extend outwardly from the stanchion 100 to provide support to the drip fitting above the receptive element.

It should be appreciated that in the foregoing description and appended claims, that the terms "substantially" and "approximately," when used to modify another term, mean "for the most part" or "being largely but not wholly or completely that which is specified" by the modified term, and may be further quantified as values or qualities which deviate approximately 10 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A support apparatus for supporting a substance receptive element to transfer a substance to a surface of a body of the livestock animal, the support apparatus having a central axis extending between a top and a bottom of the apparatus, the apparatus comprising:
   a central base toward the bottom of the apparatus;
   an upstanding stanchion mounted on the central base and being elongated along the central axis to extend toward the top of the apparatus; and
   a plurality of legs mounted on the base, each leg being elongated with an inboard end and an outboard end, each of the legs being movable between a collapsed position with respect to the central base and an expanded position with respect to the central base, the collapsed position corresponding to a transport condition of the support apparatus and the expanded position corresponding to a deployed condition of the support apparatus; and
   a substance supply assembly supported on the support apparatus toward the top of the support apparatus, the substance supply assembly including:
      a supply tank for holding a quantity of the substance, the supply tank having a tank wall defining an interior for receiving the quantity of the substance, the tank wall having a lower portion positioned toward a bottom of the supply tank, the lower portion having an upper surface; and
      a supply fitting mounted on the supply tank for exiting the substance from the supply tank;
      wherein the supply fitting is mounted on the tank wall to protrude upwardly from the upper surface of the lower portion of the tank wall.

2. The apparatus of claim 1 wherein the supply fitting has an upper end positioned in the interior of the supply tank and a lower end positioned outside the interior of the supply tank.

3. The apparatus of claim 1 wherein the substance supply assembly additionally includes a supply conduit in fluid communication with the supply fitting to receive the substance from the supply tank and a drip fitting configured to drip the substance onto the receptive element to wet the receptive element with the substance, the drip fitting being in fluid communication with the second end of the supply conduit.

4. A system for facilitating application of a substance to a surface of a body of a livestock animal, the system comprising:
  a substance receptive element configured to be moistened by the substance and configured to transfer a quantity of the substance to the surface of the body of the livestock animal when the surface comes into contact with the receptive element, the receptive element being elongate with opposite ends; and
  a support apparatus supporting the substance receptive element, the opposite ends of the receptive element being removably secured to the support apparatus at spaced locations on the apparatus, the support apparatus having a central axis extending between a top and a bottom of the apparatus, the support apparatus comprising:
    a central base toward the bottom of the apparatus;
    an upstanding stanchion mounted on the central base and being elongated along the central axis to extend toward the top of the apparatus; and
    a plurality of legs mounted on the base, each leg being elongated with an inboard end and an outboard end, each of the legs being movable between a collapsed position with respect to the central base and an expanded position with respect to the central base, the collapsed position corresponding to a transport condition of the support apparatus and the expanded position corresponding to a deployed condition of the support apparatus; and
    a receptive element securing structure for securing the receptive element to the support apparatus, the securing structure having:
      an upper portion configured to secure an uppermost one of the opposite ends of the receptive element to the stanchion, the upper portion being located toward the upper end of the stanchion such that the receptive element is suspended by the upper portion; and
      a lower portion configured to secure a lowermost one of the opposite ends of the suspended receptive element to one of the legs, the lower portion being secured to the respective leg at a location toward the outboard end of the leg such that the suspended element extends downwardly and outwardly with respect to the stanchion.

5. The system of claim 4 wherein the receptive element securing structure includes a pair of securing structures located on opposite sides of the stanchion.

6. The system of claim 4 wherein the upper portion of the securing structure includes an upper clamping member configured to clamp onto the uppermost end of the receptive element, the upper clamping member being movable with respect to the stanchion to facilitate a degree of movement of the element with respect to the stanchion; and
  wherein the lower portion includes a lower clamping member configured to clamp onto the lowermost end of the receptive element,
  each of the clamping members including a gripping part having a plurality of projecting spikes extending into the receptive element.

7. The system of claim 4 wherein the receptive element securing structure includes a tension element configured to apply a degree of tension to the receptive member to permit a degree of movement of the receptive element under tension when the body of the livestock animal comes into contact with the element.

8. The system of claim 7 wherein the tension member comprises a spring member.

9. A support apparatus for supporting a substance receptive element to transfer a substance to a surface of a body of the livestock animal, the support apparatus having a central axis extending between a top and a bottom of the apparatus, the apparatus comprising:
  a central base toward the bottom of the apparatus;
  an upstanding stanchion mounted on the central base and being elongated along the central axis to extend toward the top of the apparatus; and
  a plurality of legs mounted on the base, each leg being elongated with an inboard end and an outboard end;
  wherein each of the legs is movable between a collapsed position with respect to the central base and an expanded position with respect to the central base, the collapsed position corresponding to a transport condition of the support apparatus and the expanded position corresponding to a deployed condition of the support apparatus;
  wherein the central base includes a plurality of mounting structures with a said mounting structure being associated with each of the legs for mounting said leg to the base, each of the mounting structures securing one of the legs to the central base in the collapsed position of the transport condition and the expanded position of the deployed condition, each of the mounting structures including a channel receiving a portion of a said leg and a pivot pin pivotally connecting said leg to the channel of the respective mounting structure;
  wherein each of the mounting structures comprises a positioning slot for guiding movement of the leg between the collapsed position and the expanded position, the positioning slot being configured to receive the pivot pin of the mounting structure such that the pivot pin moves along the positioning slot as the leg moves between the collapsed and expanded positions.

10. The apparatus of claim 9 wherein the positioning slot of a said mounting structure is configured to permit sliding movement of the leg with respect to the channel between the collapsed and expanded positions.

11. The apparatus of claim 10 wherein the positioning slot of each mounting structure has a primary portion and a secondary portion, the pivot pin of the mounting structure being located in the primary portion of the positioning slot when the leg is in the expanded position and being located in the secondary portion of the positioning slot when the leg is in the collapsed position.

\* \* \* \* \*